US012617306B2

(12) United States Patent
Nessler et al.

(10) Patent No.: US 12,617,306 B2
(45) Date of Patent: May 5, 2026

(54) ENERGY SUPPLY DEVICE FOR MOVING BODY AND CONTROL DEVICE OF THE MOVING BODY

(71) Applicant: Honda Motor Co., Ltd., Tokyo (JP)

(72) Inventors: Jens Nessler, Offenbach/Am Main (DE); Marcus Kleinehagenbrock, Offenbach/Am Main (DE)

(73) Assignee: Honda Motor Co., Ltd., Tokyo (JP)

( * ) Notice: Subject to any disclaimer, the term of this patent is extended or adjusted under 35 U.S.C. 154(b) by 911 days.

(21) Appl. No.: 17/848,356

(22) Filed: Jun. 23, 2022

(65) Prior Publication Data

US 2023/0415596 A1     Dec. 28, 2023

(51) Int. Cl.
| | |
|---|---|
| *B60L 53/31* | (2019.01) |
| *B60L 53/16* | (2019.01) |
| *B60L 53/30* | (2019.01) |
| *B60L 53/60* | (2019.01) |

(52) U.S. Cl.
CPC .............. *B60L 53/31* (2019.02); *B60L 53/16* (2019.02); *B60L 53/305* (2019.02); *B60L 53/60* (2019.02); *B60L 2250/16* (2013.01); *B60L 2250/22* (2013.01)

(58) Field of Classification Search
CPC ........ B60L 53/31; B60L 53/60; B60L 53/305; B60L 53/16
USPC ........................................................ 320/109
See application file for complete search history.

(56) References Cited

U.S. PATENT DOCUMENTS

| | | | | |
|---|---|---|---|---|
| 5,462,439 | A * | 10/1995 | Keith ........................ | B60L 1/12 439/246 |
| 5,850,135 | A * | 12/1998 | Kuki ..................... | B60L 53/665 320/108 |
| 9,873,347 | B2 * | 1/2018 | Brown .................... | B60L 53/36 |
| 10,286,799 | B2 * | 5/2019 | Namou ................... | B60L 53/30 |
| 2010/0013434 | A1 * | 1/2010 | Taylor-Haw .......... | G07F 15/005 320/109 |
| 2013/0249470 | A1 * | 9/2013 | Martin .................... | B60L 53/12 320/107 |
| 2022/0258630 | A1 * | 8/2022 | Paterson ................. | B60L 53/65 |

FOREIGN PATENT DOCUMENTS

| | | |
|---|---|---|
| CN | 108162772 | 6/2018 |
| CN | 108989412 | 12/2018 |
| CN | 213024834 | 4/2021 |
| CN | 114084020 | 2/2022 |
| CN | 114256925 | 3/2022 |

(Continued)

OTHER PUBLICATIONS

Translation of EP2712762, 8 pages (Year: 2014).*
"First Office Action of China Counterpart Application", with English translation thereof, issued on Mar. 19, 2026, pp. 1-15.

*Primary Examiner* — Nathaniel R Pelton
(74) *Attorney, Agent, or Firm* — JCIPRNET

(57) ABSTRACT

An energy supply device for a moving body and a control device of the moving body are provided. The energy supply device includes a supply connector, connected to a supply plug extending from the moving body; a push button, mounted to protrude in a protruding direction toward the moving body; and an indicator, having a display bar that changes according to a movement distance of the push button in a direction opposite to the protruding direction.

6 Claims, 8 Drawing Sheets

(56)         References Cited

FOREIGN PATENT DOCUMENTS

| | | | |
|----|----|----|----|
| CN | 216033843 | 3/2022 | |
| EP | 2712762 A1 * | 4/2014 | ......... B62D 15/0285 |
| JP | 2004303137 | 10/2004 | |
| WO | WO 2021/001073 * | 1/2021 | |

* cited by examiner

10

ENERGY SUPPLY DEVICE FOR MOVING BODY AND CONTROL DEVICE OF THE MOVING BODY

BACKGROUND

Technical Field

The disclosure relates to an energy supply device for a moving body and a control device of the moving body.

Description of Related Art

Electric cars have been well developed in recent years. In addition to electric cars, the peripheral devices such as charging devices are also well developed. The charging device is usually installed on the wall or pillar at houses or public facilities. The charging plug provided on and extended from a vehicle is connected to a connector of the charging device to charge the batteries of the vehicle.

During the charging, the positioning of the vehicle when the charging plug is to be connected to the connector of the charging device is determined by the automatic driving system, the driving support system, or manual driving. In general, the positioning in the right-left direction of the vehicle with respect to the charging device is performed by recognizing a positioning marker (black/yellow) using, for example, a camera at the vehicle side.

However, there is an accuracy issue in regard to the positioning in the front-rear direction of the vehicle with respect to the charging device. If the front and rear positioning of the vehicle is not performed correctly, there is a possibility that the charging device would be damaged. If the car stops too far away from the charging device, then the charging plug is too far away from the connector to allow for charging. If the car stops too close, it might bump into the wall. The charging plug will only be extended after the car has stopped, so that it cannot be damaged. Extension stops as soon as the charging plug reaches the connector.

In recent years, efforts have been made in order to realize a low-carbon society or a decarbonized society, and research and development on the electric cars is being carried out in order to reduce $CO_2$ emissions and improve energy efficiency in vehicles as well.

SUMMARY

In view of the above issue, in the technique related to the electric cars, there is a demand to properly perform the positioning in the front-rear direction of the vehicle with respect to the energy supply device.

The disclosure realizes correct positioning in the front-rear direction of the vehicle with respect to the energy supply device in order to address the above issue. The disclosure also contributes to the improvement of energy efficiency.

According to one embodiment of the disclosure, an energy supply device for a moving body is provided. The energy supply device includes a supply connector, connected to a supply plug extending from the moving body; a push button, mounted to protrude in a protruding direction toward the moving body; and an indicator, having a display bar that changes according to a movement distance of the push button in a direction opposite to the protruding direction.

According to one embodiment, in the above energy supply device, a size of the display bar of the indicator is changed according to the movement distance that the push button is moved in the direction opposite to the protruding direction. According to one embodiment, in the above energy supply device, a color of the display bar of the indicator is changed according to the movement distance that the push button is moved in the direction opposite to the protruding direction.

According to one embodiment, in the above energy supply device, the energy supply device may further include a notification part that provides a predetermined notification to the moving body when the indicator is in a predetermined status. According to one embodiment, in the above energy supply device, the predetermined notification is performed in a manner of light or sound.

According to one embodiment, in the above energy supply device, the predetermined status may be that a color of the display bar of the indicator is changed from a first color to a second color.

According to one embodiment, in the above energy supply device, the indicator may further include: a first rod, on which the push button is mounted and which is movable as the push button moves in the direction opposite to the protruding direction; a sliding mechanism, sliding with a movement of the first rod; and a second rod, being movable as the sliding mechanism slides. The display bar of the indicator is changed based on a movement amount of the second rod. According to one embodiment, in the above energy supply device, the movement amount of the first rod is detected by a sensor or a mechanic structure.

According to one embodiment, in the above energy supply device, the indicator may further include: a first rod, on which the push button is mounted and which is movable as the push button moves in the direction opposite to the protruding direction; a gear mechanism, rotating with a movement of the first rod; and a second rod, being movable as the gear mechanism rotates. The display bar of the indicator is changed based on a movement amount of the second rod. According to one embodiment, in the above energy supply device, the movement amount of the first rod is detected by a sensor or a mechanic structure.

According to another embodiment, a control device of a moving body is provided and the control device includes an environment recognition part, acquiring environment recognition data around the moving body; and a distance calculation part, calculating distance data between the moving body and an energy supply device based on the environment recognition data. The energy supply device for supplying energy to the moving body includes: a supply connector, connected to a supply plug extending from the moving body; a push button, mounted to protrude in a protruding direction toward the moving body; and an indicator, having a display bar that changes according to a movement distance, which is used as the distance data, of the push button in a direction opposite to the protruding direction. The distance calculation part is configured to calculate the movement distance by detecting a change of the display bar of the indicator using the environment recognition part.

According to the another embodiment, in the above control device, the control device may further include: a supply plug, connected to the supply connector of the energy supply device by extending the supply plug from the moving body; and a control part, performing a movement control of the moving body based on the movement distance calculated by the distance calculation part. When the supply plug is to be connected to the supply connector, the control part performs positioning in a front-rear direction of the moving body based on the movement distance.

According to the another embodiment, in the above control device, a size or a color of the display bar of the indicator is changed according to the movement distance that the push button is moved in the direction opposite to the protruding direction.

According to the another embodiment, in the above control device, a notification part is further provided in the energy supply device or in the moving body to perform a predetermined notification to the moving body when the indicator is in a predetermined status.

According to the another embodiment, in the above control device, the predetermined notification is performed in a manner of light or sound.

According to the another embodiment, in the above control device, the predetermined status is that a color of the display bar of the indicator is changed from a first color to a second color.

As described above, the indicator of the energy supply device may be recognized by, for example, a camera of a vehicle, and the recognized indicator may be reflected to the control device of the vehicle. As a result, the indicator may serve as a reference for the driving operation when the vehicle is manually driven by the user (or driver), and accurate positioning for stopping the vehicle in the front-rear direction with respect to the energy supply device can be performed, and damage to the energy supply device and the supply plug due to that the car stops too close and might bump into the wall can be suppressed. Also, the recognized indicator may also be provided to the automatic driving system or the driving support system of the vehicle, so that the vehicle may be automatically stopped in the front-rear direction with respect to the energy supply device.

DESCRIPTION OF THE EMBODIMENTS

Figure 1:
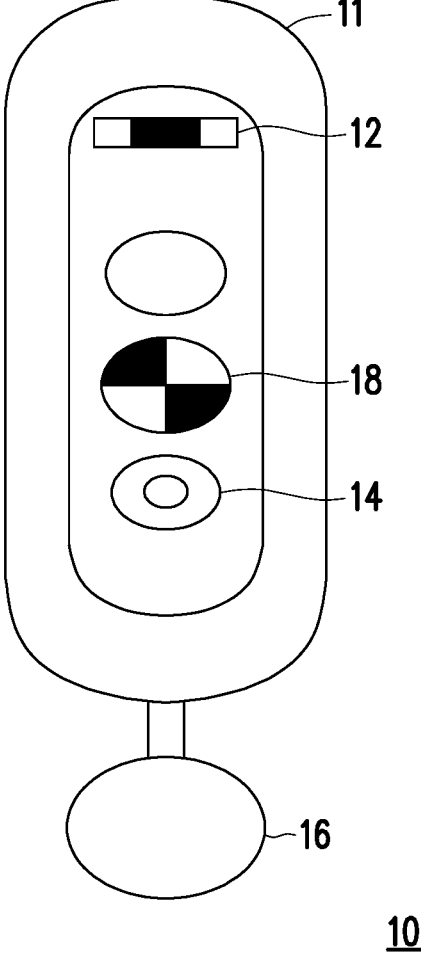
FIG. 1 illustrates a schematic diagram of an energy supply device according to one embodiment of the disclosure.

FIG. 1 illustrates a schematic diagram of an energy supply device according to one embodiment of the disclosure. The energy supply device that provides electricity to a vehicle will be described as an example in the embodiment, but the supplied energy is not limited thereto.

In FIG. 1, the energy supply device 10 includes an indicator 12, a positioning marker 18, a supply connector 14, and a push button 16. The indicator 12 has a display bar and may provide information of a distance between a vehicle and the energy supply device 10, which allows the user (or driver) of the vehicle to learn how close the vehicle is to the energy supply device 10. By using this indicator 12, the vehicle can stop at a proper position for charging the vehicle. The energy supply device 10 has a housing 11 including a main part and an extension part. The indicator 12, the positioning marker 18 and the supply connector 14 are mounted on the main part of the housing and the push button 16 is mounted on the extension part extending from the main part.

The supply connector 14 of the energy supply device 10 can provide a connection between the energy supply device 10 and the vehicle through a supply plug (a charging plug in the embodiment). After the supply plug is plugged into the supply connector 14, an electrical connection is established and the energy supply device 10 can start to provide electricity to charge the vehicle.

The push button 16 is provided to be capable of coming in contact with the vehicle and thus a color or size of the display bar of the indicator 12 can be changed accordingly to inform the user of the distance between the vehicle and the energy supply device 10. The detailed mechanism will be further described below with examples. In one example, if the vehicle is a car, the push button 16 may be designed to be in contact with the bumper of the car.

Figure 2A:
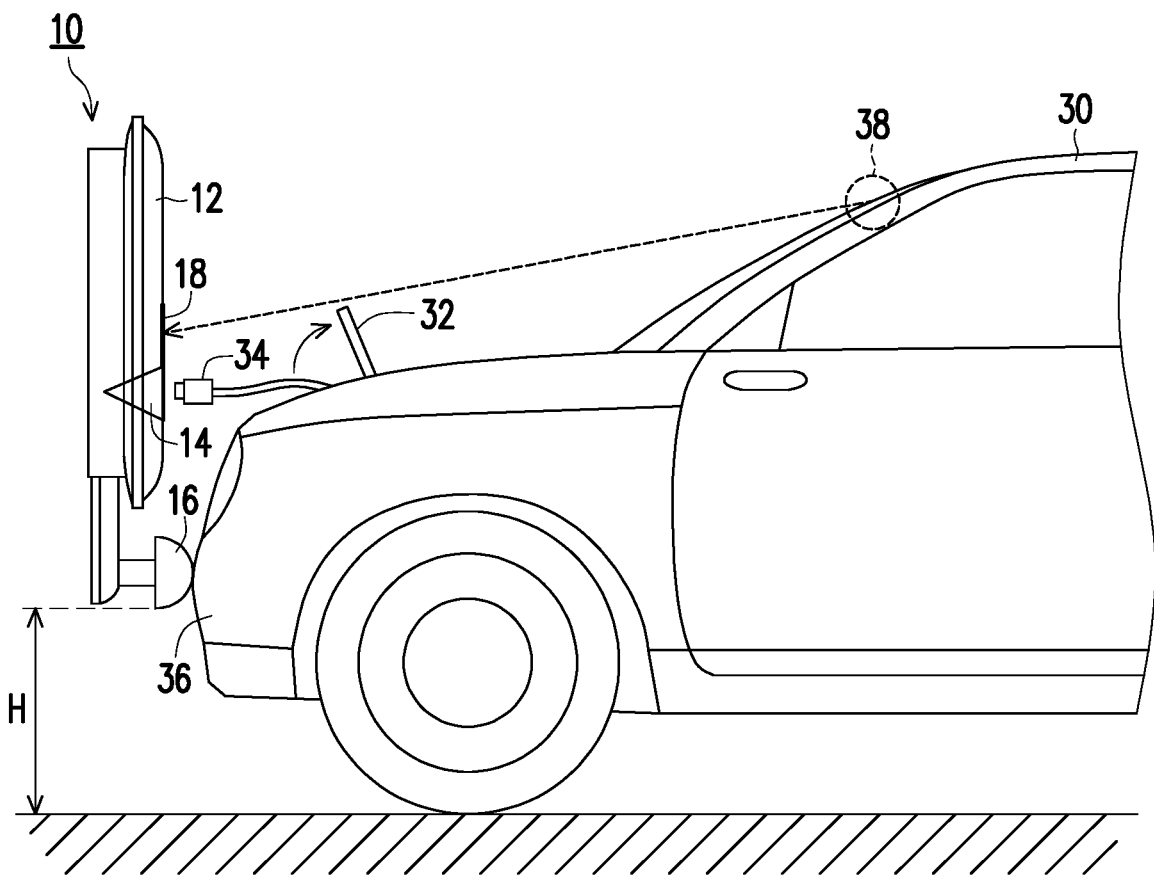
FIGS. 2A and 2B illustrate a situation when a vehicle prepares to use the energy supply device FIG. 1.
Figure 2B:
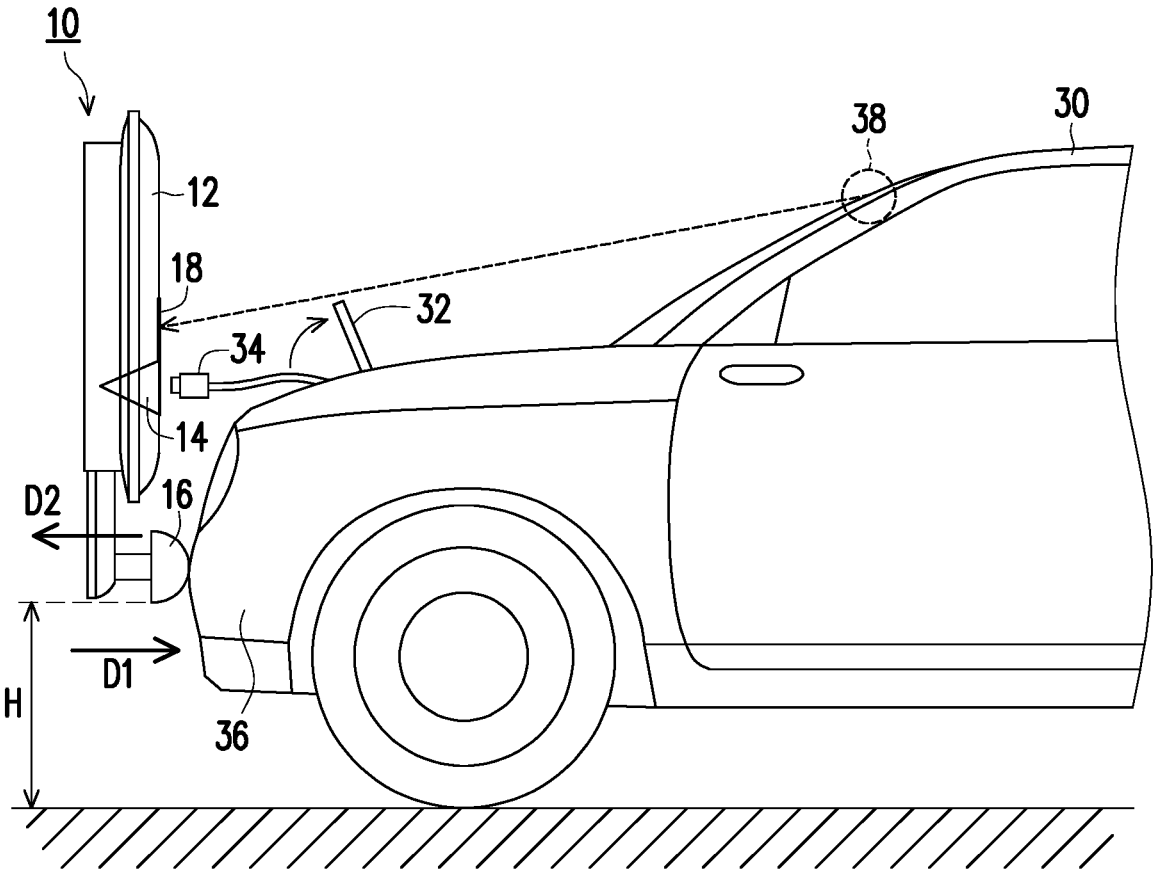

FIGS. 2A and 2B illustrate a situation when a vehicle prepares to use the energy supply device of FIG. 1. Referring to FIGS. 2A and 2B, the push button 16 is mounted under the housing 11 of the energy supply device 10 at a height H from the ground, and the height for example can be set to correspond to the height of the bumper 36 of the car 30, so that the bumper 36 of the car 30 can push the push button 16. The push button 16 is installed to protrude toward the vehicle in a protruding direction D1 (see FIG. 2B). For example, the protruding direction D1 may be substantially parallel to the road surface. When the user prepares to park the car for charging, the user drives the car to approach the energy supply device 10, and then the bumper 36 of the car 30 starts to push the push button 16 to move by a movement distance in a direction D2 opposite to the protruding direction D1 of the push button 16.

Due to the movement of the push button 16, the movement distance in the direction D2 changes as the car 30 moves forwards. The change of the movement distance in the direction D2 also causes the display bar of the indicator 12 to change its size or color correspondingly. When the color is changed from a first color to a second color or the size becomes the minimum (detailed description will be provided below), the corresponding movement distance represents the proper parking position for charging and the indicator is in a predetermined status.

Figures 2C, 2D:
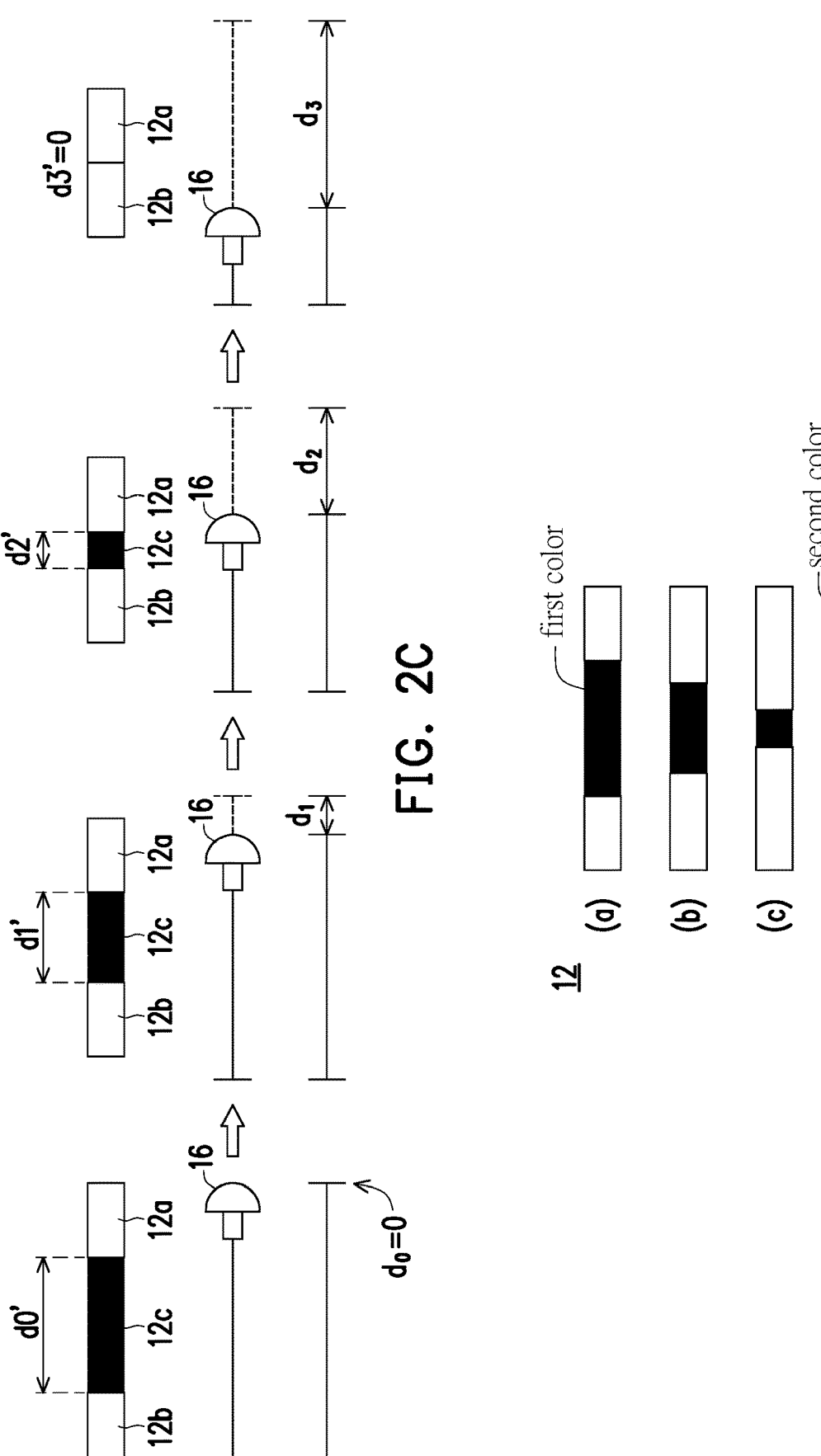
FIG. 2C illustrates changes of the display bar of an indicator of the energy supply device according to one embodiment of the disclosure.
FIG. 2D illustrates the change sequence of the display bar.

FIG. 2C illustrates changes of the display bar of the indicator of the energy supply device according to one embodiment of the disclosure. As shown in FIG. 2C, the display bar of the indicator 12 includes a pair of bar shields 12a, 12b and a bar 12c. The bar 12c may refer to a first color bar that is fixed at a predetermined position, and as an example, the bar 12c may be formed in black. The pair of bar shields 12a, 12b may refer to a second color bar and may be formed in a notable color such yellow. The pair of bar shields 12a, 12b is configured to be movable to each other and capable of covering the bar 12c. In this manner, at the beginning, the display bar is presented in black, i.e., the pair of bar shields 12a, 12b does not shield the bar 12c, and finally, the pair of bar shields 12a, 12b shields the bar 12c completely so that the display bar is presented in yellow.

At the beginning, at the instance when the bumper 36 of the car 30 begins to contact the push button 16, the distance d0 of the movement of the push button 16 is 0, and the display bar of the indicator 12 is in its initial state, i.e., the bar 12*c* is in its initial length (or size) d0', which is a maximum length. Next, the car 30 keeps moving and the bumper 36 of the car 30 pushes the push button 16 to move to a movement distance d1, and then the pair of bar shields 12*a*, 12*b* also moves inwards to each other, so that a portion of the bar 12*c* is shielded and the length (or size) d1' of the bar 12*c* becomes smaller. Next, the car 30 keeps moving and the bumper 36 of the car 30 keeps pushing the push button 16 to move to a movement distance d2, and then the pair of bar shields 12*a*, 12*b* also moves inwards to each other, so that a further portion of the bar 12*c* is shielded and the length (or size) d2' of the bar 12*c* becomes smaller. Finally, the car 30 moves to the proper position and the bumper 36 of the car 30 pushes the push button 16 to move to a movement distance d3, and then the pair of bar shields 12*a*, 12*b* also moves inwards to each other to completely shield the bar 12*c* and the length (or size) d3' of the bar becomes 0 (invisible). As a result, when the car 30 reaches the proper position for charging, the color of the indication marker 12 is changed from the first color (black) to the second color (yellow).

FIG. 2D illustrates the change sequence of the display bar. As shown, according to the embodiment, the color of the display bar of the indicator 12 is changed from the first color (such as black) to the second color (such as yellow). During the process, the size of the display bar of the indicator 12 is also changed. In this way, when the car 30 is away from the energy supply device 10, the display bar of the indicator 12 is in black (status (a)). When the car 30 gets closer to the energy supply device 10 at an immediate distance, the display bar of the indicator 12 is in black and yellow (status (b), (c)). When the car 30 gets closer to the energy supply device 10 at a short distance (or the proper position), the display bar of the indicator 12 is in yellow (status (d)). In this manner, the user (driver) can monitor the color change or size change of the display bar of the indicator 12, and then park the car 30 at the proper position for charging.

In addition, the car may be equipped with an image capturing device such as a camera 38 mounted on the windshield of the car 30 to capture the image of the display bar of the indicator 12. This captured image may be provided to the driver assistance system or the autonomous driving system, and the car 30 may be automatically parked at the proper position for charging.

As shown in FIG. 2A, after the car 30 stops at the proper position according to the change of the display bar of the indicator 12, the lid 32 is opened and the supply plug (charging plug) 34 is extended to connect to the supply connector 14 of the energy supply device 10. In this way, accurate positioning for parking the car 30 in the front-rear direction with respect to the energy supply device 30 can be performed, and damage to the energy supply device 10 and the supply plug 34 due to that the car stops too close and might bump into the wall can be suppressed.

The mechanism of correlation between the change of display bar of the indicator 12 and the movement of the push button will be described in detail.

Figure 3:
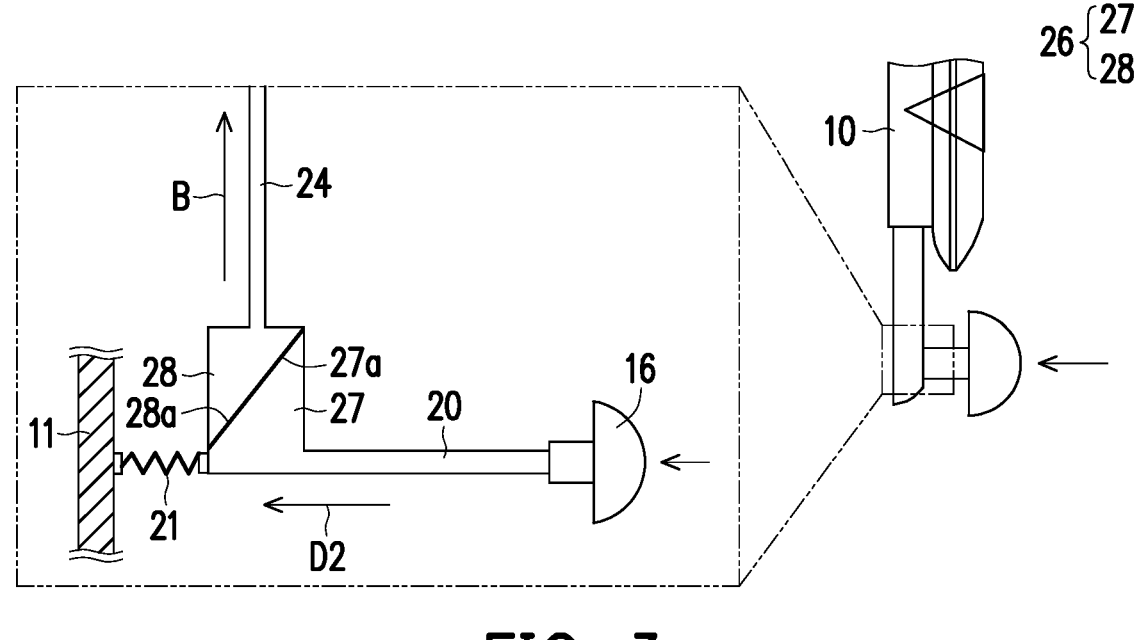
FIG. 3 illustrates a mechanism of the indicator according to one embodiment of the disclosure.

FIG. 3 illustrates a mechanism of the indicator according to one embodiment of the disclosure. As shown in FIG. 3, in addition to the display bar, the indicator 12 further includes a first rod 20, a second rod 24 and a sliding mechanism 26.

One end of the first rod 20 is mounted with the push button 16 of the energy supply device 10, and the other end of the first rod 20 is resiliently coupled to the housing 11 through a resilience component 21, such as a spring. In this way, when the bumper 36 of the car 30 can push the push button 16, the first rod 20 is moved accordingly in the direction D2 opposite to the protruding direction D1. In addition, when the car 30 drives away, the resilience component 21 provides a resilience force to the first rod 20, and the first rod 20 and the push button 16 return to their initial positions.

In addition, the sliding mechanism 26 includes a first inclined plane component 27 with a first inclined plane 27*a* and a second inclined plane component 28 with a second inclined plane 28*a*. The first inclined plane component 27 is provided on the other end of the first rod 20, so that the first inclined plane component 27 may move together with the first rod 20. In addition, the second inclined plane component 26 is provided on one end of the second rod 24, so that the second inclined plane component 28 may move together with the second rod 24.

The first inclined plane 27*a* of the first inclined plane component 27 and the second inclined plane 28*a* of the second inclined plane component 28 are in contact with each other, so that the first inclined plane component 27 and the second inclined plane component 28 may slide to each other. When the first inclined plane component 27 is moved in the direction D2 due to the movement of the first rod 20, the first inclined plane component 27 may push the second inclined plane component 28 to slide in the direction B. As a result, the second rod 24 is moved upwards due to the sliding of the second inclined plane component 28.

The other end of the second rod 24 is coupled to the display bar of the indicator 12. As described above, the second rod 24 is movable as the sliding mechanism 26 slides, i.e., as the second inclined plane component 28 slides. Then, the second rod 24 will move and the size or color is changed accordingly, which will be described in detail. In addition, in this embodiment, the second rod 24 is substantially configured to be perpendicular to the first rod 20 due to the housing structure of the energy supply device 10, but may be also arranged in other configurations based on the housing structure of the energy supply device 10.

Figure 4:
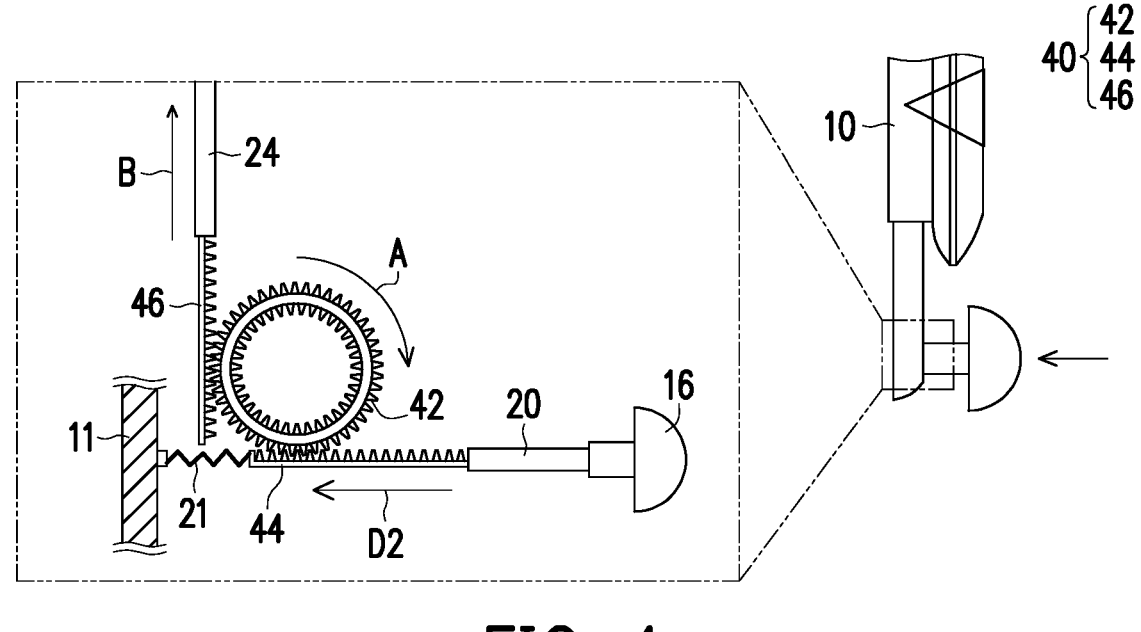
FIG. 4 illustrates a mechanism of the indicator according to another embodiment of the disclosure.

FIG. 4 illustrates a mechanism of the indicator according to another embodiment of the disclosure. In this embodiment, the indicator 12 further includes a first rod 20, a second rod 24 and a gear mechanism 40, and the sliding mechanism 26 in FIG. 3 is replaced with the gear mechanism 40. The components the same as or similar to those in FIG. 3 will not be repeatedly described.

As shown in FIG. 4, the gear mechanism 40 includes a gear 42, a first gear rack 44 and a second gear rack 46. One end of the first gear rack 44 is coupled to the other end of the first rod 20 and the other end of the first gear rack 44 is coupled to the resilience component 21. The first gear rack 44 may move together with the first rod 20 when the car 30 drives to push the push button 16. One end of the second gear rack 46 is coupled to one end of the second rod 24 and the other end of the second gear rack 44 is a free end.

In addition, the first gear rack 44 and the second gear rack 46 are meshed with the gear 42. When the bumper 36 of the car 30 pushes the push button 16, the push button 16 is pushed to move in the direction D2 opposite to the protruding direction D1 and the first rod 20 is accordingly moved in the direction D2. As a result, the first gear rack is also moved in the direction D2. Due to the movement of the first gear rack 44 in the direction D2, the gear 42 rotates in a direction A. When the gear 42 starts rotating, the second gear rack 46 meshed with the gear 42 starts moving upwards in the direction B. As a result, the second rod 24 is also moved upwards in the direction B.

The other end of the second rod 24 is coupled to the display bar of the indicator 12. As described above, the second rod 24 is movable as the gear mechanism 42 rotates, i.e., as the second gear rack 46 moves due to the rotation of the gear 42. Then, the second rod 24 will move and the size or color is changed accordingly, which will be described in detail.

Figure 5B:
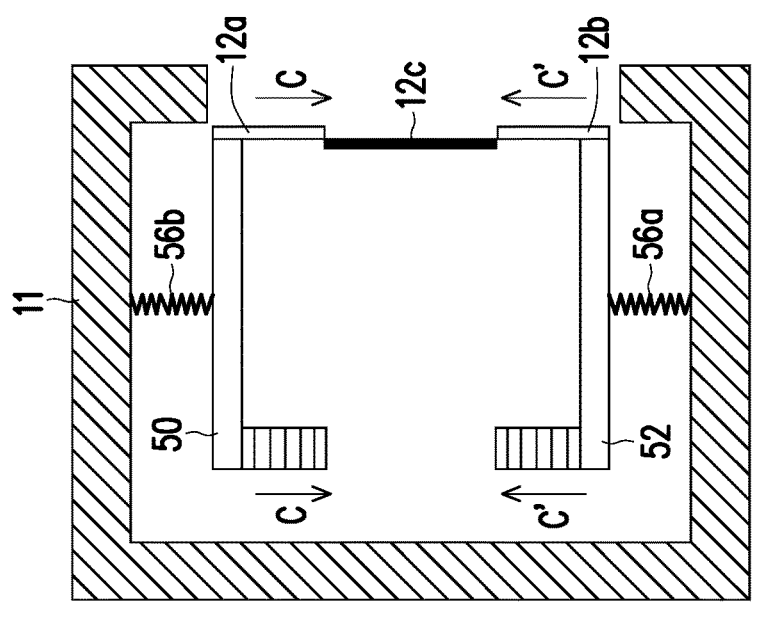
FIG. 5B illustrates a top view of the mechanism for changing the size or color of the display bar of the indicator.
Figure 5A:
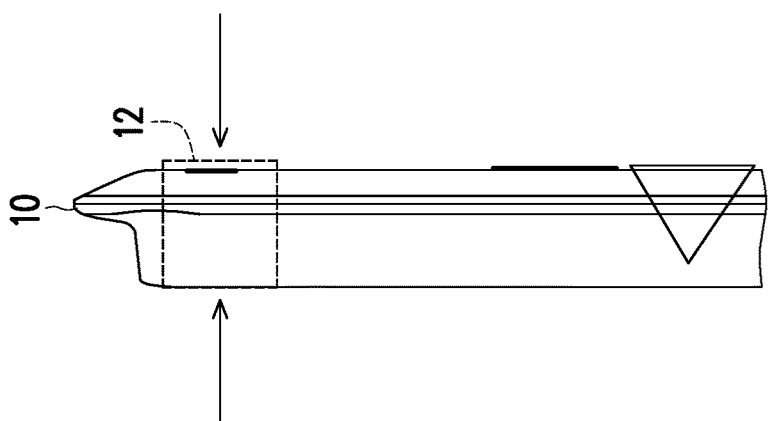
FIG. 5A illustrates a rear view of a mechanism for changing the size or color of the display bar of the indicator.
Figure 5A:
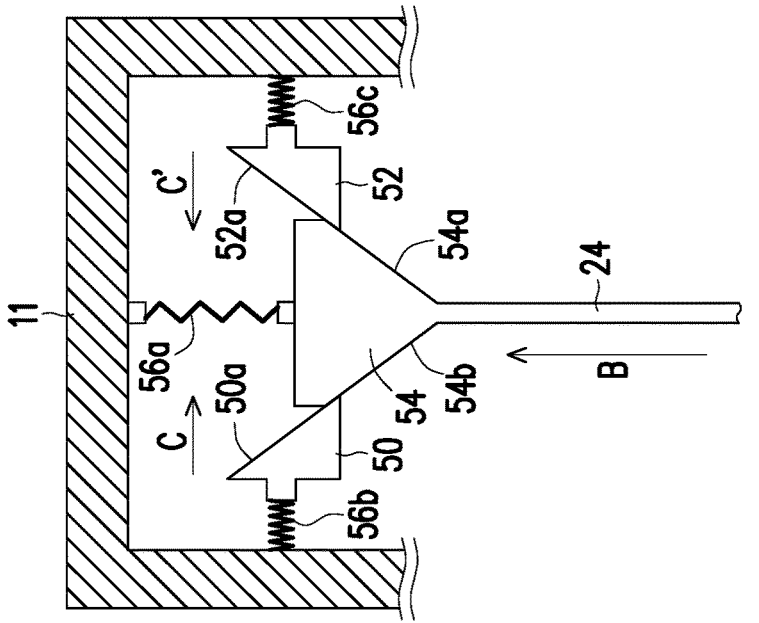

FIG. 5A illustrates a rear view of a mechanism for changing the size or color of the display bar of the indicator. FIG. 5B illustrates a top view of the mechanism of for changing the size or color of the display bar of the indicator.

Referring to FIG. 5A together with FIG. 3 or FIG. 4, the other end of the second rod 24 in FIG. 3 or FIG. 4 is further provided with an inclined plane component 54 with a first inclined plane 54a and a second inclined plane 54b. The inclined plane component 54 is further coupled to a resilience component 56a that is fixed to a ceiling of the housing 11 of the energy supply device 10, so that the second rod 24 may move back and forth in the direction B. The first inclined plane 54a and the second inclined plane 54b are respectively in contact with an inclined plane 52a of a first movable support 52 and an inclined plane 50a of a second movable support 54.

In this configuration, when the second rod 24 is moved upwards in the direction B due to the sliding of the sliding mechanism 26 in FIG. 3 or the rotation of the gear mechanism 40 in FIG. 4, the inclined plane component 54 is also moved upwards and then the inclined plane 54a and the second inclined plane 54b push the inclined plane 52a of the first movable support 52 and the inclined plane 50a of the second movable support 50 respectively to slide As a result, the first movable support 52 and the second movable support 50 are respectively moved inwards in the directions C, C' to each other.

Referring to FIG. 5B, one end of the first movable support 52 is coupled to the bar shield 12b and the other end of the first movable support 52 is provided with the inclined plane 52a. Also, one end of the second movable support 50 is coupled to the bar shield 12a and the other end of the second movable support 50 is provided with the inclined plane 50a. The first movable support 52 may be resiliently coupled to the housing 11 through a resilience component 56c and the second movable support 50 may be resiliently coupled to the housing 11 through a resilience component 56b, so that the first movable support 52 and second movable support 50 may move in the direction C.

Referring to FIGS. 5A, 5B and 2C, as described above, when the second rod 24 is moved upwards in the direction B, the inclined plane component 54 releases the first movable support 52 and the second movable support 50, the resilience component 56b pushes the second movable support 50 and the resilience component 56c pushes the first movable support 52. Therefore, the movements of the first movable support 52 and the second movable support 50 makes the pair of bar shields 12a, 12b move together in the directions C, C' respectively, so that the pair of bar shields 12a, 12b may shield the bar 12c.

As described above, when the pair of bar shields 12a, 12b starts moving to shield the bar 12c, the size (or length) of the bar 12c of the display bar gradually becomes smaller and smaller and eventually the bar 12c is completely shielded by the pair of bar shields 12a, 12b. Also, during the process of shielding the bar 12c, the color of the bar 12c is changed from the first color (black, not shielded) to the second color (yellow, completely shielded).

Therefore, when the user drives the car 30 to approach the energy supply device 10, the bumper 36 of the car 30 starts pushing the push button 16 and the display bar of the indicator 12 presents the corresponding change due to the distance of the movement of the push button being shortened. As a result, the user can easily and clearly confirm whether the car 30 parks at the proper position for charging by monitoring the change of the display bar of the indicator. Since the car 30 can be parked at the proper position for charging, damage to the energy supply device 10 and the supply plug 34 due to that the car stops too close and might bump into the wall can be suppressed.

In addition, the energy supply device 10 according to the embodiment may further include a senor to sense the movement of the push button 16 or the change of the display bar of the indicator. The energy supply device 10 may further include a notification part to notify the user (driver) of the car 30. Examples are described as follows, but they are not intended to limit the implementation of the disclosure.

Figure 6A:
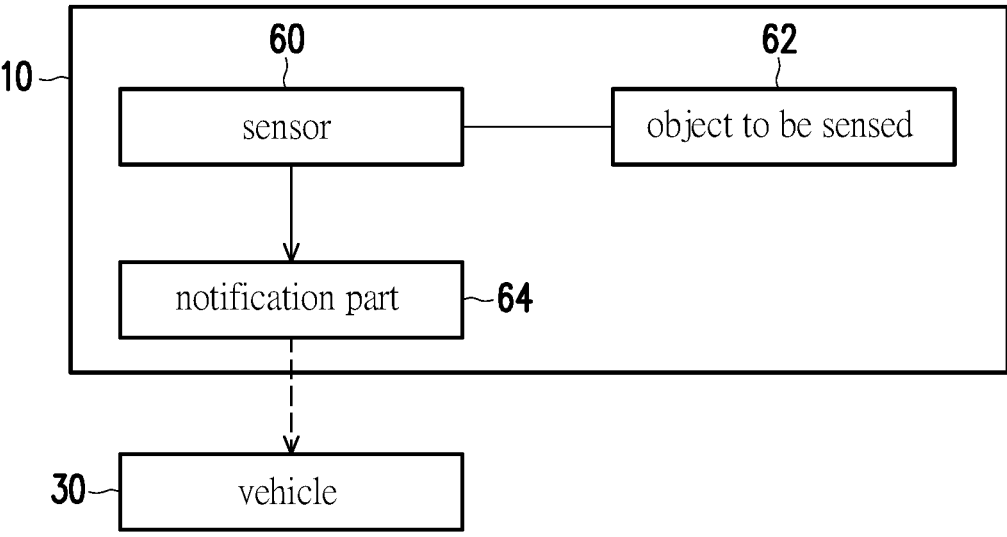
FIGS. 6A and 6B illustrate the sensor and notification configurations according to embodiments of the disclosure.

FIG. 6A illustrates an example of the senor and notification configuration according to one embodiment of the disclosure. As shown in FIG. 6A, the energy supply device 10 further includes a sensor 60 and a notification part 64, in which other components are omitted for simplification. The sensor 60 senses an object 64 to be sensed, and the object may be the first and second rods in FIGS. 3 and 4, or the display bar of the indicator 12 in FIGS. 2C-2D.

In the configuration shown in FIG. 3, the sensor 60 is configured to sense a movement amount of the first rod 20 or the second rod 24 (serves as the object 64 to be sensed) with respect to its initial position (which corresponds to a status that the push button 16 is not pushed). When the movement amount reaches a predetermined status, the sensor 60 outputs a signal to the notification part 64. As described above, once the movement amount of the first rod 20 or the second rod 24 reaches the predetermined status, it also means that the display bar of the indicator reaches its predetermined status, i.e., the car 30 has reached the proper position for charging and the user (or system) may stop the car 30. Then, the notification part 64 may notify the user that the predetermined status has been reached.

In the configuration shown in FIG. 4, the sensor 60 is configured to sense a rotation amount of the gear mechanism 40. In this embodiment, the rotation amount corresponds to a movement amount of the first rod 20, and therefore, the rotation amount of the gear 42 of the gear mechanism 40 with respect to its initial position may be sensed. When the movement amount of the first rod 20 or the rotation amount of the gear mechanism 40 reaches the predetermined status, the sensor 60 outputs a signal to the notification part 64. Then, the notification part 64 may notify the user that the predetermined status has been reached.

In addition, the sensor 60 may be configured to sense the change of the display bar of the indicator. In this embodiment, a camera that captures the image of the display bar or a contact switch that establishes a connection when a predetermined status has been reached may be used as the sensor 60. The sensor 60 may sense the status of the display bar of the indicator, such as the statuses (a)~(d) shown in FIG. 2D. In one example, the predetermined status may be set to the status (c) or status (d). As a result, when the sensor 60 senses that the status (c) or (d) has been reached, the sensor 60 outputs a signal to the notification part 64. In addition, if the signal is output at the status (c), notification lag may be compensated. Further, the signal output to the notification part 64 may be performed by a communication method.

According to one embodiment, the notification part 64 may be configured by using a speaker (sound), a lamp (light) or a display monitor, and the user may learn the position status of the car 30 quickly. The notification part 64 is not limited to the above examples, and may be any device that is able to inform or be recognized by the user, or the automatic driving system or driving support system.

Figure 6B:
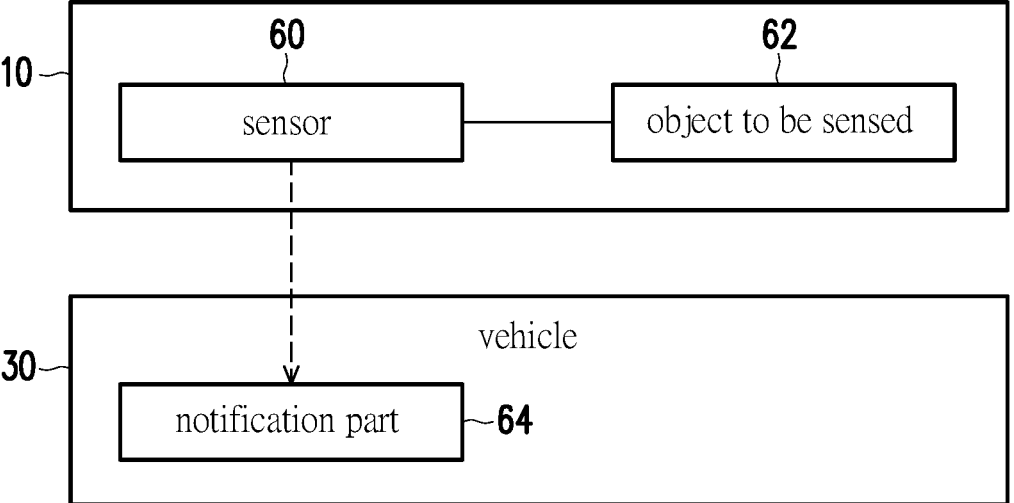

FIG. 6B illustrates another example of the senor and notification configurations according to one embodiment of the disclosure. In this embodiment, the notification part 64 is different while the sensor configurations are the same as those in FIG. 6A. In this embodiment, the notification part 64 is provided in the vehicle, any part of the vehicle, or a device held by the user, for example, the navigation system, speaker, head up display or horn provided in the car 30, or the smart phone possessed by the user. Namely, the notification part 64 may be provided inside or outside the car 30.

Figure 7:
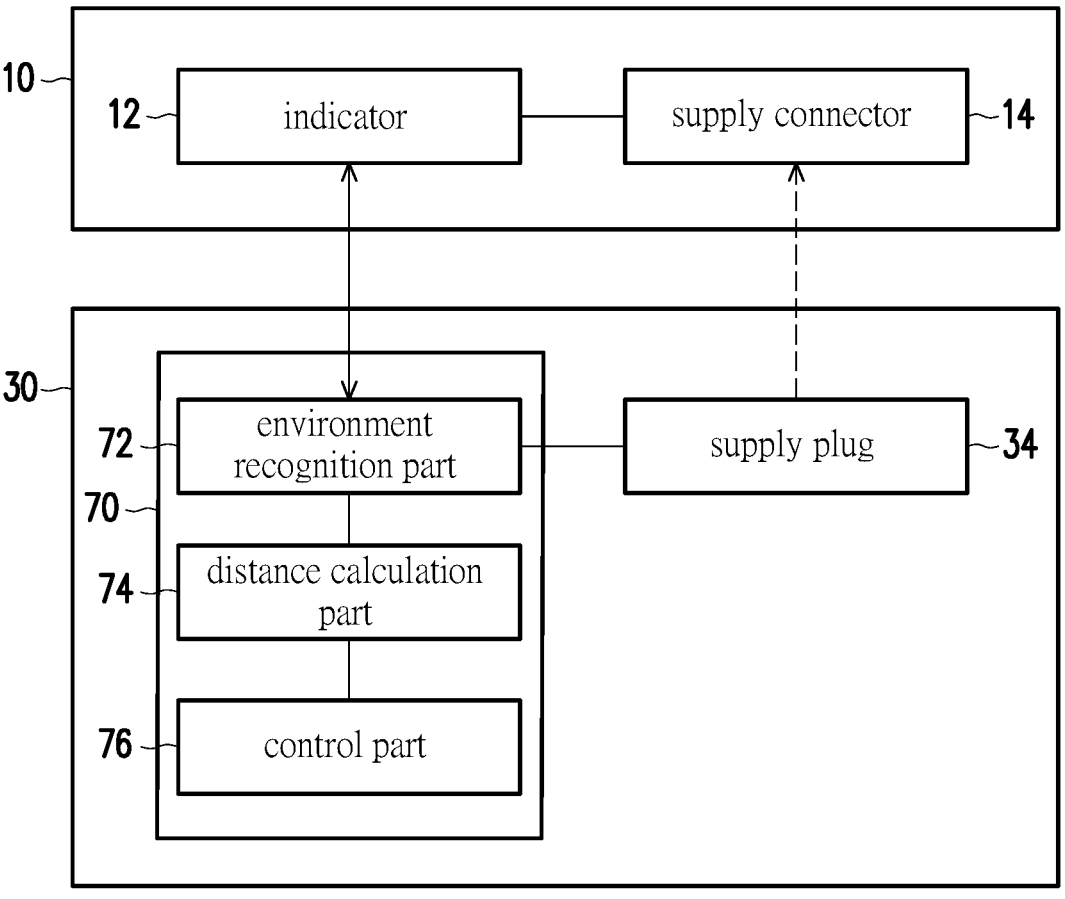
FIG. 7 illustrates a control device of the moving body according to another embodiment of the disclosure.

FIG. 7 illustrates a control device of the moving body according another embodiment of the disclosure. In FIG. 7, the control device 70 of the moving body (such as the car 30 in the previous descriptions) is used to control the car 30, and may be configured by an ECU of the car 30. The control device 70 includes an environment recognition part 72, a distance calculation part 74 and a control part 76. The environment recognition part 72 is configured to acquire the environment recognition data around the moving body, which may be implemented by, for example, a camera 38 shown in FIG. 2A. The environment recognition part 72 may use radar, lidar, sonar, etc., or may be any suitable device.

The distance calculation part 74 is configured to calculate distance data between the moving body and the energy supply device 10 based on the environment recognition data. The distance data may be the movement distance of the push button 16 described above. The distance calculation part 74 is configured to calculate the movement distance by detecting the change of the display bar of the indicator using the environment recognition part. In one example, the environment recognition data may be the change of the display bar of the indicator 12 as described above.

The control device 70 further includes a control part 76 for performing a movement control of the car 30 based on the movement distance calculated by the distance calculation part. When the supply plug 34 of the car is to be connected to the supply connector 14 of the energy supply device 10, the control part 76 is configured to perform positioning in a front-rear direction of the car 30 body based on the movement distance. In this manner, the car 30 may be manually or automatically stopped at the proper position for charging.

In summary, the indicator of the energy supply device may be recognized by, for example, a camera of a vehicle, and the recognized indicator may be reflected to the control of the vehicle. As a result, the indicator may serve as a reference for the driving operation when the vehicle is manually driven by the user (or driver), and the accurate positioning for stopping the vehicle in the front-rear direction with respect to the energy supply device 30 can be performed, and damage to the energy supply device 10 and the supply plug 34 can be suppressed. Also, the recognized indicator may also be provided to the automatic driving system or the driving support system of the vehicle, so that the vehicle may be automatically stopped in the front-rear direction with respect to the energy supply device 30.

In the above embodiment, the moving body is described as a car as an example. However, the moving body can be other kinds of vehicles, such as bike, Segway, ship, and aircraft. The energy supply device may be suitably modified according to the type of the vehicle.

In addition, in the above embodiment, the energy supply device is configured to supply the electricity to the car, but the energy supply device may be suitable to provide fuel or gas to the vehicle.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control device of a moving body, comprising:
an environment recognition part, acquiring environment recognition data around the moving body; and
a distance calculation part, calculating distance data between the moving body and an energy supply device based on the environment recognition data,
wherein the energy supply device for supplying energy to the moving body comprises:
a supply connector, connected to a supply plug extending from the moving body;
a push button, mounted to protrude in a protruding direction toward the moving body; and
an indicator, having a display bar that changes according to a movement distance, which is used as the distance data, of the push button in a direction opposite to the protruding direction,
wherein the distance calculation part is configured to calculate the movement distance by detecting a change of the display bar of the indicator using the environment recognition part.

2. The control device according to claim 1, further comprising:
a supply plug, connected to the supply connector of the energy supply device by extending the supply plug from the moving body; and
a control part, performing a movement control of the moving body based on the movement distance calculated by the distance calculation part,
wherein when the supply plug is to be connected to the supply connector, the control part performs positioning in a front-rear direction of the moving body based on the movement distance.

3. The control device according to claim 1, wherein
a size or a color of the display bar of the indicator is changed according to the movement distance that the push button is moved in the direction opposite to the protruding direction.

4. The control device according to claim 1, wherein a notification part is further provided in the energy supply device or in the moving body to perform a predetermined notification to the moving body when the indicator is in a predetermined status.

5. The control device according to claim 4, wherein the predetermined notification is performed in a manner of light or sound.

6. The control device according to claim 4, wherein the predetermined status is that a color of the display bar of the indicator is changed from a first color to a second color.

* * * * *